July 30, 1929.  E. C. TAYLOR  1,722,641

SUPPORTING ARRANGEMENT FOR VEHICLE LAMPS

Filed July 26, 1927  2 Sheets-Sheet 1

EDWARD COOPER TAYLOR
INVENTOR

BY Duell, Dunn & Anderson
ATTORNEY

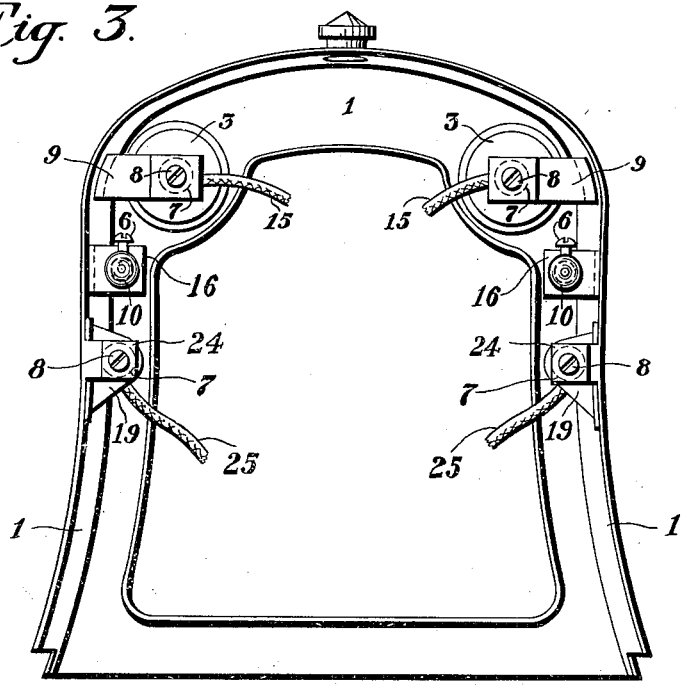
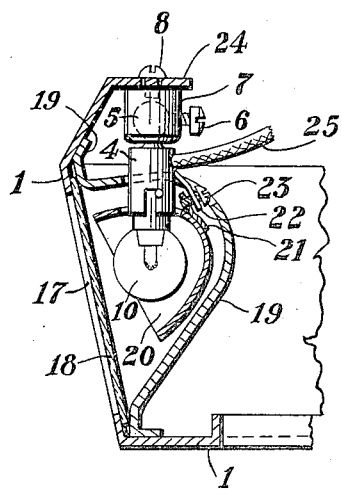
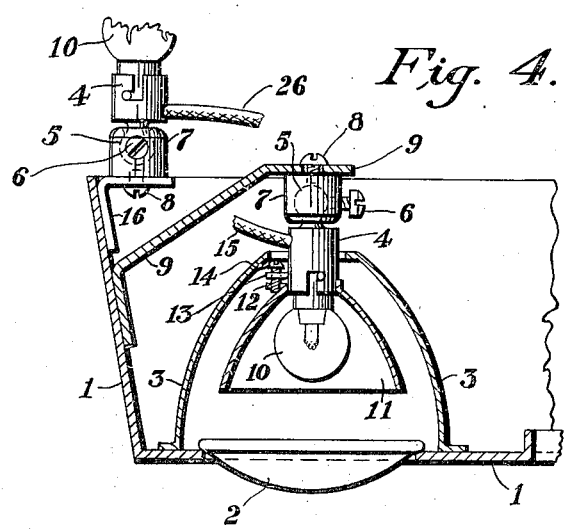

Patented July 30, 1929.

1,722,641

UNITED STATES PATENT OFFICE.

EDWARD COOPER TAYLOR, OF NEW YORK, N. Y.

SUPPORTING ARRANGEMENT FOR VEHICLE LAMPS.

Application filed July 26, 1927. Serial No. 208,430.

This invention relates to improvements in arrangements for supporting lamps for use on automobiles, or similar vehicles, and more particularly, in some of its details, the invention relates to an improved automobile radiator frame or casing embodying a construction for housing and supporting lamps utilized in connection with the automobile.

It is a general object of the invention to provide an improved radiator casing construction designed and arranged to form a unitary illuminating fixture and housing and supporting the vehicle lamps in a convenient, efficient and economical manner.

A further object is to provide a radiator casing, embodying, in a unitary construction, an improved arrangement for housing and mounting the vehicle lamps and preventing unsightly protruding or dangerously exposed parts of the illuminating fixtures.

A further object is to provide improved mountings for vehicle lamps arranged in a particularly effective manner so to permit the lamps to be installed or removed with a minimum of effort and to enable them to be easily adjusted when in position through a readily accessible adjusting mechanism.

Still another object is to provide, in an automobile radiator frame, an improved mounting for the vehicle lamps which not only effectively supports and protects the lamps, but also provides a compact construction and presents and appearance of neatness.

Other objects will be in part pointed out in the following detailed description of an illustrative but preferred embodiment of the invention, and will be in part obvious in connection therewith.

This invention accordingly comprises the features of construction, combinations of elements, and arrangement of parts, which will be exemplified in the construction hereinafter set forth and the scope of the application of which will be indicated in the claims.

For a more complete disclosure of the nature, objects and advantages of the invention, reference is had to the following detailed description of the illustrative embodiment and to the accompanying drawings, in which Fig. 1 is a front elevation of an automobile radiator casing embodying the invention;

Fig. 3 is a rear elevation;

Fig. 4 is a detailed, enlarged section, taken approximately on the line IV—IV of Fig. 1, and Fig. 5 is an enlarged section on line V—V of Fig. 1.

Figure 1:
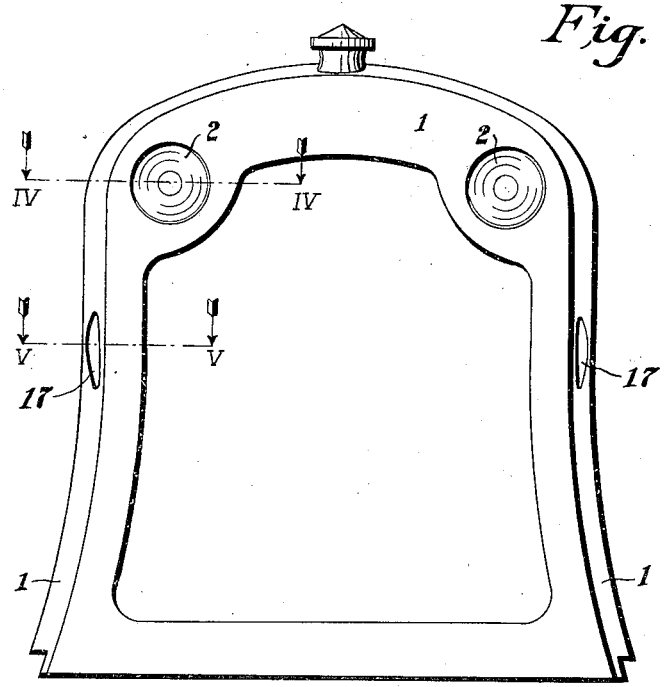

Referring to the drawing for a detailed description of the embodiment there shown, a radiator casing, or frame 1 is illustrated, having upright side frame members or plates, arranged to enclose and support the automobile radiator in a well known manner. The side frame members and top frame member are angular in section including a front flange or frame plate and rearwardly extending side flange or frame plate, these flanges forming the front and side walls of the radiator casing. The inner margins of the casing surrounding the radiator opening are preferably flanged inwardly.

The top frame front plate may be relatively wide and at the corners thereof where it joins the upright frame plates, integral corner gusset plates are provided in each of which apertures, or openings, are formed. Head light lenses 2 are suitably mounted at the rear of and in alignment with these apertures, and a cup-shaped head light receptacle or housing 3 is removably secured upon the rear face of the radiator casing in alignment with each of the head light lenses. Both head lights are of similar construction, and a description of one will suffice for both.

An opening is formed in the rear end of the receptacle 3 in which is positioned a lamp holder or socket 4 having a ball and socket universal connection 5 with a supporting block 7, said universal adjusting connection being held in adjusted position by means of a set screw 6. The block 7 is secured in position by a screw 8 to a supporting bracket 9, carried by the radiator casing.

An electric lamp 10 is carried by the socket 4, and a reflector 11 is also supported upon said socket for adjustment longitudinally thereof. A lug 12 is carried by the reflector and an aligned lug 13 is carried by the socket while a screw 14 is threaded to these lugs so as to provide a means for moving the reflector forwardly or rearwardly with reference to the lamp filament so as to correctly focus the light rays. The adjusting screw is arranged and positioned so as to be readily accessible through the hole at the rear of the receptacle or housing 3 from a position at the rear of the radiator casing, and can be conveniently reached by opening the hood of the engine housing. An electric conductor 15 is attached to the socket 4, leading from a suitable source of energy through an appropriate control.

If desired, a trouble lamp unit may be mounted upon the rear of the radiator casing at either or both sides thereof, as shown in Fig. 4, by means of a bracket 16. This unit embodies a universal ball and socket similar to that described in connection with the head light, and corresponding parts are similarly numbered. An electric conductor 26 leads to this lamp.

Figure 2:
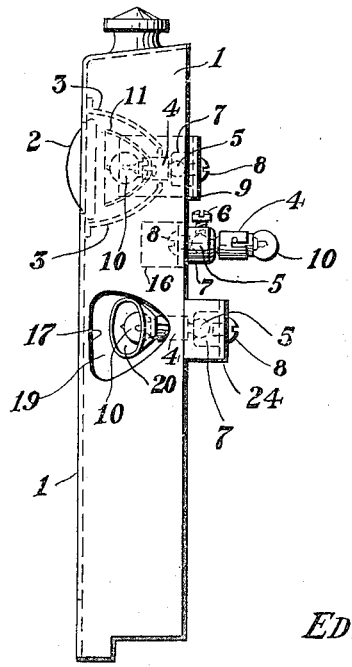
Fig. 2 is a side elevation thereof.

As best shown in Figs. 2, 3, and 5, ditch lamps of similar construction are positioned at the sides of the radiator casing, and are arranged to throw beams of light laterally from the car so as to illuminate the sides of the roadway or other laterally disposed areas. These ditch lamps are also carried by the radiator casing wholly within the outer surface thereof, and are preferably supported by universally adjustable ball and socket mountings similar to those described in connection with the head lights and corresponding parts being similarly numbered. Each ditch lamp and accessory parts are carried by a bracket 24 which may be attached to the radiator casing, and is shown as forming an integral bent part thereof.

Each ditch lamp has a glass or lens 17 mounted in or in alignment with an opening 18 formed in the rearwardly disposed frame plate of the casing and positioned with reference to the lamp whereby rays of light may be thrown laterally. A lamp receptacle or housing 19 similar to the housing 3 above described is removably mounted on the radiator casing directly at the rear of the opening 18, having an opening in which the socket 4 is received. A reflector 20 is also supported upon the socket 4 and is adjustable thereon for focussing by means of lugs 21, 22 mounted respectively on the reflector and socket, a cooperating adjusting screw 23 being used to effect the adjustment. It will thus be seen that the focus may be adjusted from a position at the rear of the radiator casing, the adjusting device being readily accessible from such position without removal or disassembly of any of the parts. A supply conductor 25 is provided for each ditch lamp, and the lamp may be controlled from the driver's compartment.

It will be observed that both the head lights and the ditch lights, with parts accessory thereto, are mounted entirely within the outer surface of the radiator casing, thus presenting a neat and finished appearance, and providing, moreover, an exceptionally compact arrangement and avoiding outwardly projecting parts which might be in the way and especially subject to damage. The lamps are also effectively housed and protected by the radiator casing.

Since certain changes may be made in the above construction, and different embodiments of the invention could be made without departing from the scope thereof, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A unitary illuminating fixture for automobiles including a radiator casing having one or more forwardly directed head lights and one or more laterally directed ditch lights carried thereby and mounted within the outer walls of the casing.

2. A unitary illuminating fixture for automobiles including a radiator casing having angularly disposed front and side frame plates and carrying one or more forwardly directed head lights and one or more laterally directed ditch lights mounted within the frame plates, said casing having an opening in the front plate for each head light and an opening in the side plate for each ditch light.

3. In combination, an automobile radiator casing having a rearwardly extending side flange provided with a lamp opening, a lens mounted in alignment with said opening, a ditch lamp mounted within said casing and positioned to cast a beam of light laterally of the automobile through said opening toward the side of the road, a lamp-enclosing protective receptacle carried by said radiator casing, a lamp-supporting bracket attached to said casing and supported thereby independently of said protective receptacle and disposed so as to support the lamp within said receptacle, and a reflector supported within said receptacle.

4. In combination, an automobile radiator casing having a rearwardly extending side flange provided with a lamp opening, a lens mounted in alignment with said opening, a ditch lamp mounted within said casing and positioned to cast a beam of light laterally of the automobile through said opening toward the side of the road, said ditch lamp being mounted within said casing and positioned relatively thereto so as to be shielded thereby to avoid projection of light rays forwardly perpendicularly to the plane of the radiator casing.

5. In an illuminating fixture for automobiles, in combination, a headlight mounted to project light rays forwardly, a ditch light positioned at an angle to the position of said headlight, a mounting for said ditch light limiting it as to position and movement to cast a beam of light rays laterally at an angle to the beam cast by said headlight, a radiator casing having openings in the walls thereof, and said headlight and ditch light being mounted within said casing walls so as to project light rays respectively through said openings.

In testimony whereof I affix my signature.

EDWARD COOPER TAYLOR.